US007498762B2

(12) United States Patent
Takada

(10) Patent No.: US 7,498,762 B2
(45) Date of Patent: Mar. 3, 2009

(54) MOTOR

(75) Inventor: Masayuki Takada, Aichi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/628,276

(22) PCT Filed: Jun. 21, 2005

(86) PCT No.: PCT/JP2005/011309

§ 371 (c)(1),
(2), (4) Date: Nov. 30, 2006

(87) PCT Pub. No.: WO2006/001262

PCT Pub. Date: Jan. 5, 2006

(65) Prior Publication Data

US 2007/0222305 A1  Sep. 27, 2007

(30) Foreign Application Priority Data

Jun. 25, 2004  (JP)  ............................. 2004-187733

(51) Int. Cl.
*H02P 1/16* (2006.01)
(52) U.S. Cl. ........................................ 318/778; 310/43
(58) Field of Classification Search ................. 318/778; 310/43
See application file for complete search history.

(56) References Cited

U.S. PATENT DOCUMENTS 6,081,056 A * 6/2000 Takagi et al. .................. 310/89

6,661,134 B2 * 12/2003 Sunaga et al. ................. 310/64
2002/0079755 A1 * 6/2002 Sunaga et al. ............. 310/67 R

FOREIGN PATENT DOCUMENTS

| JP | 54-159666 A | 12/1979 |
|---|---|---|
| JP | 62-40049 A | 2/1987 |
| JP | 3-293711 A | 12/1991 |
| JP | 6-163326 A | 6/1994 |
| JP | 8-196065 A | 7/1996 |
| JP | 2000-228570 A | 8/2000 |
| JP | 2000-340210 A | 12/2000 |
| JP | 2001-339909 | 12/2001 |
| JP | 2003-319615 | 11/2003 |
| JP | 2003319615 A | * 11/2003 |

OTHER PUBLICATIONS

International Search Report for corresponding International PCT Application No. PCT/JP2005/011309 dated Oct. 4, 2005.

* cited by examiner

*Primary Examiner*—Walter Benson
*Assistant Examiner*—Anthony M Paul
(74) *Attorney, Agent, or Firm*—RatnerPrestia

(57) ABSTRACT

A motor includes a drive circuit for driving a rotor by controlling a current applied to an armature winding of a stator, and a capacitor for smoothing a voltage supplied to the armature winding and/or a capacitor for smoothing a supply voltage from outside on a same board. The board and the stator are integrally molded in using resin. Prior to the molding, capacitors are sealed inside a cylindrical metal case with a closed top face by rubber, and a pair of lead terminals protrude outside through this sealing rubber. The capacitors are mounted upright on the board and fixed by applying adhesive at two diagonally opposite areas on a bottom end of the metal case.

6 Claims, 7 Drawing Sheets

FIG. 6A
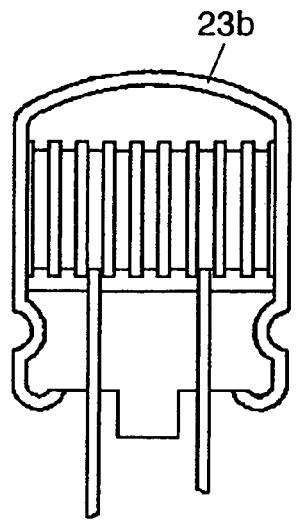
FIG. 6B
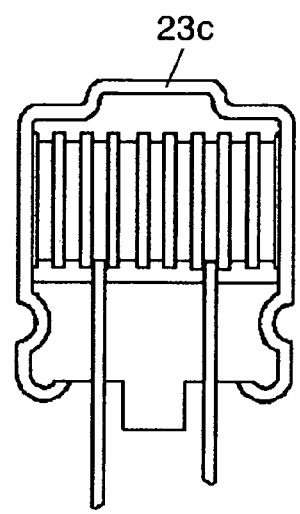
FIG. 7 PRIOR ART
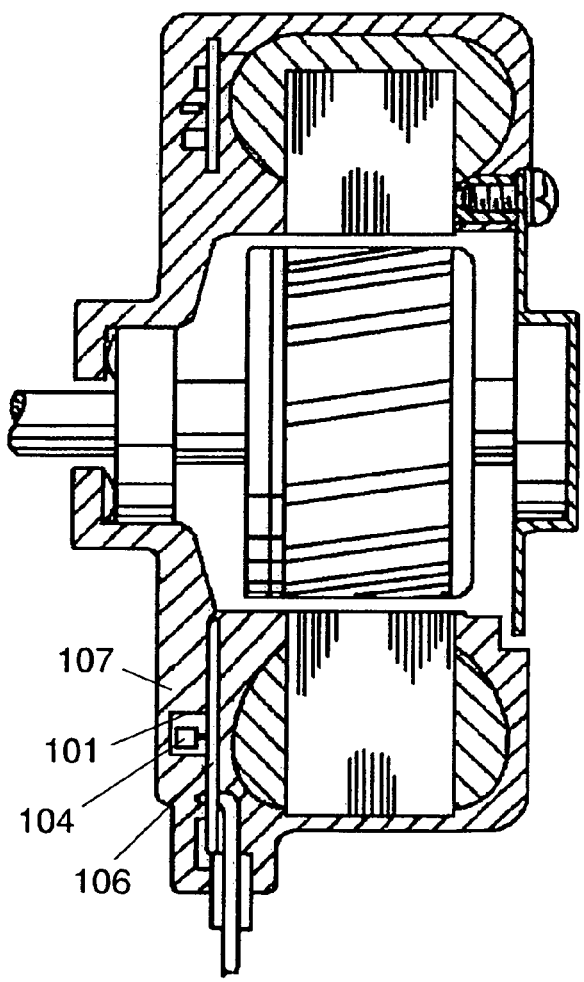

MOTOR

This application is a U.S. National Phase Application of PCT International Application No. PCT/JP2005/011309 dated Jun. 21, 2005

TECHNICAL FIELD

The present invention relates to motors, typically for driving ventilating equipment for air supply and exhaust such as inline duct fans and recessed ceiling fans, and other fans in air blowers, humidifiers, dehumidifiers, freezers, air conditioners, and boilers.

BACKGROUND ART

There are strong demands for lower price, more efficient, and quieter motors for driving fans mounted in electric appliances such as ventilating equipment. Since induction motors are not amenable to drastic improvements in efficiency, brushless DC motors using permanent magnets are increasingly being adopted.

In this type of motor, a capacitor provided on a wiring board is covered with a protective case and then molded in using molding resin, as typically disclosed in Unexamined Japanese Patent Publication No. 2001-339909.

This motor is described below with reference to FIGS. 7 and 8. As shown in these Figures, box-shaped protective case 101 made of synthetic resin has door 102 on its front face. A pair of notches 103 continuing from the opening on the front face is provided on a bottom face of protective case 101. A pair of pins 105 of cylindrical aluminum electrolytic capacitor 104 with a closed top face is inserted into these notches 103, and aluminum electrolytic capacitor 104 is housed inside protective case 101. Door 102 is closed to completely enclose a body of aluminum electrolytic capacitor 104 inside protective case 101. Then, as shown in FIG. 7, wiring board 106 is molded in using molding resin 107.

Some of these types of motors also have a reinforcing rib with an electrolytic capacitor disposed sideways inside a component housing case, which has a curved top face with highest part at the center. This is then molded in using molding resin, as typically disclosed in Unexamined Japanese Patent Publication No. 2003-319615.

This motor is described below with reference to FIGS. 9 to 11. As shown in the Figures, protective case 112 is configured with component housing case 113 and cover case 115 coupled to this component housing case 113 using sheet hinge 119. Reinforcing rib 114 is formed on an inner face of component housing case 113 and cover case 115 respectively. Cover case 115 has curved top face 116.

Cylindrical electrolytic capacitor 111 with a closed top face containing electrolytic solution is housed in component housing case 113. A pair of lead terminals 117 of electrolytic capacitor 111 is led out downward through lead-terminal exiting groove 118. Then, cover case 115 is closed, and protective case 112 is molded in together with printed circuit board 121 using molding resin 120.

In these conventional motors, a separate material is used for the protective case to protect the aluminum electrolytic capacitor during molding. This leads to an increased number of processing steps and higher costs. Accordingly, there is demand for a set up to prevent damage to the capacitor without the need for the protective case.

In addition, the top face of the case of the electrolytic capacitor tends to deform in the direction of applied pressure. Therefore, even though the top face is designed to avoid directly receiving the injection pressure of molding resin, the top face may be damaged by the air around the capacitor being compressed. If the top face is damaged, it pushes against a wound element inside the case. This may cause the element and a lead terminal with a different pole to this element to come into contact and thus increase leakage current. Accordingly, there is demand for a reliable way to prevent damage to the top face of case of the capacitor.

In addition, since aluminum electrolytic capacitors contain electrolytic solution, gas is continuously generated by chemical reaction when the current is applied, and the gas escapes from the case through the sealing rubber. This may cause migration. Accordingly, there is demand for a reliable way to eliminate the occurrence of migration.

SUMMARY OF THE INVENTION

A motor of the present invention includes a stator in which an armature winding is wound around a slotted stator iron core via an insulator; a rotor rotatably disposed relative to this stator; a drive circuit disposed on a board for controlling a current applied to the armature winding and rotation of the rotor; and at least one of the first capacitor and the second capacitor disposed on the same board as the above. The first capacitor smoothes a voltage supplied to the armature winding, and the second capacitor smoothes a supply voltage from outside.

In this motor, the board and the stator are integrally molded in using resin, which forms a cover. The drive circuit includes a group of switching elements for supplying the current to the armature winding and a drive logic controller for controlling an on and off state of the group of switching elements.

In the first and/or second capacitor, a wound element, in which an anode foil and a cathode foil are wound, is housed inside a cylindrical metal case with a closed top face, and the metal case is sealed with rubber. Their anode lead terminal and cathode lead terminal protrude outside through this sealing rubber. The first and/or second capacitor is mounted upright on the board and fixed by applying adhesive at two diagonally opposite areas on a bottom end of the metal case.

This structure offers a high-quality motor which prevents damage to the capacitor, increased leakage current, and migration, without the need for a protective case made of a separate material which is needed for molding in the prior art.

BRIEF DESCRIPTION OF THE DRAWINGS

FIG. 6A is a sectional view of another shape of a top face of the capacitor to be installed in the motor.

FIG. 6B is a sectional view of still another shape of the top face of the capacitor to be installed in the motor.

FIG. 7 is a sectional view of a conventional motor.

REFERENCE MARKS IN THE DRAWINGS

Figure 1:
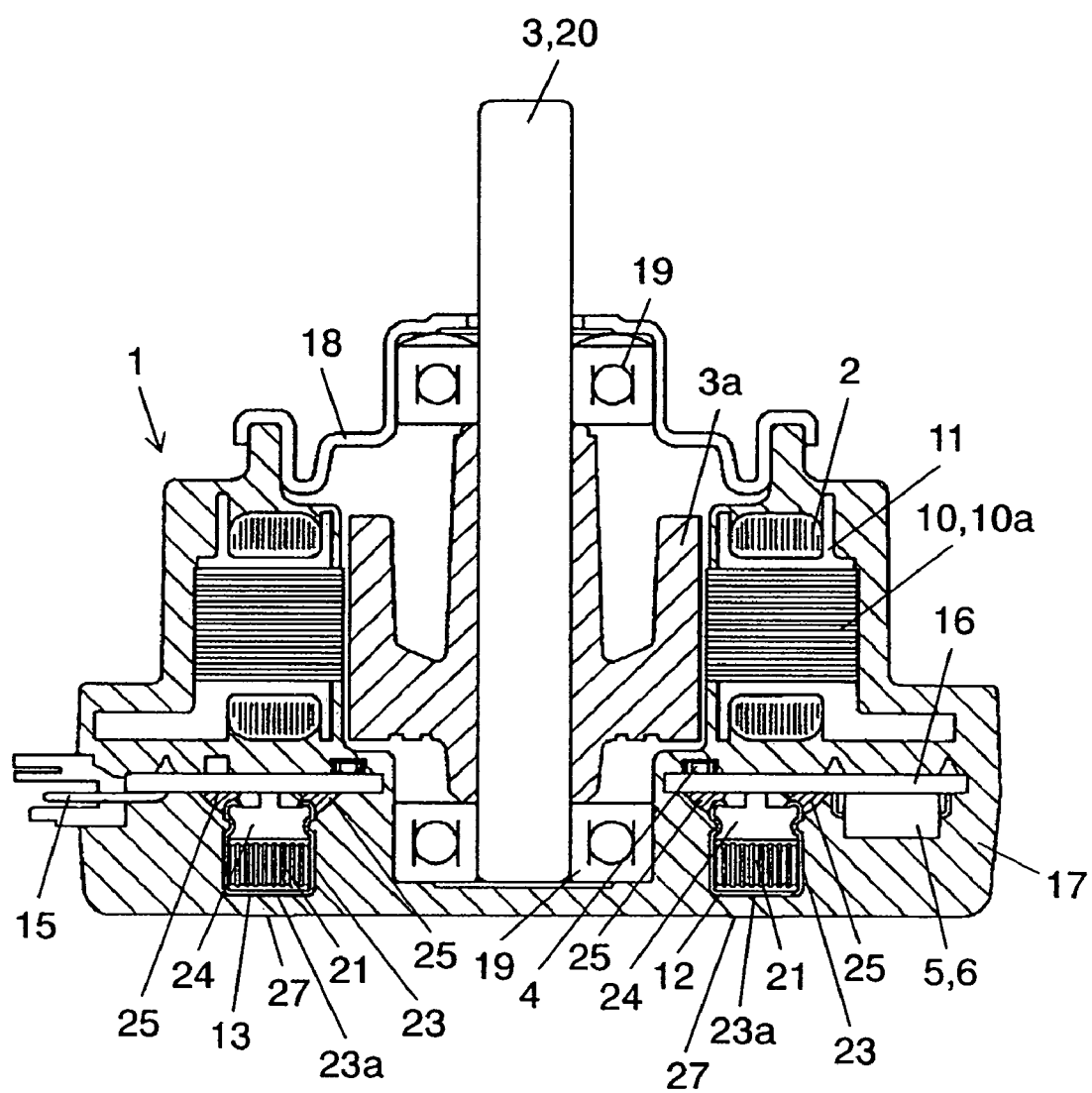
FIG. 1 is a sectional view of a motor in accordance with an exemplary embodiment of the present invention.
Figure 2:
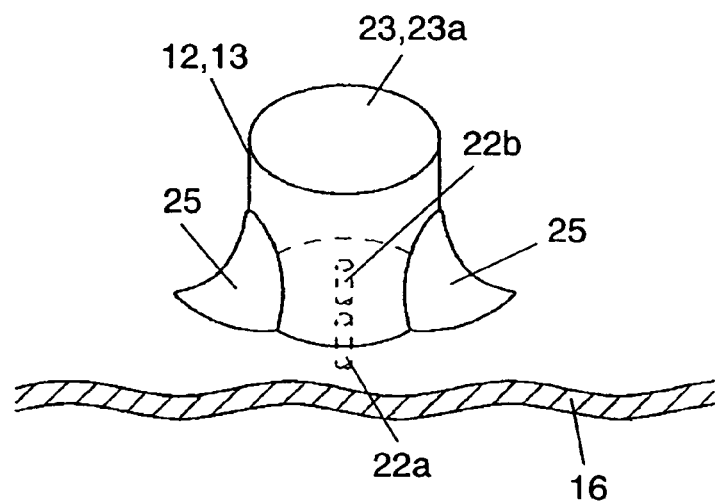
FIG. 2 is a perspective view illustrating the state that a capacitor of the motor is mounted and fixed onto a board.
Figure 3:
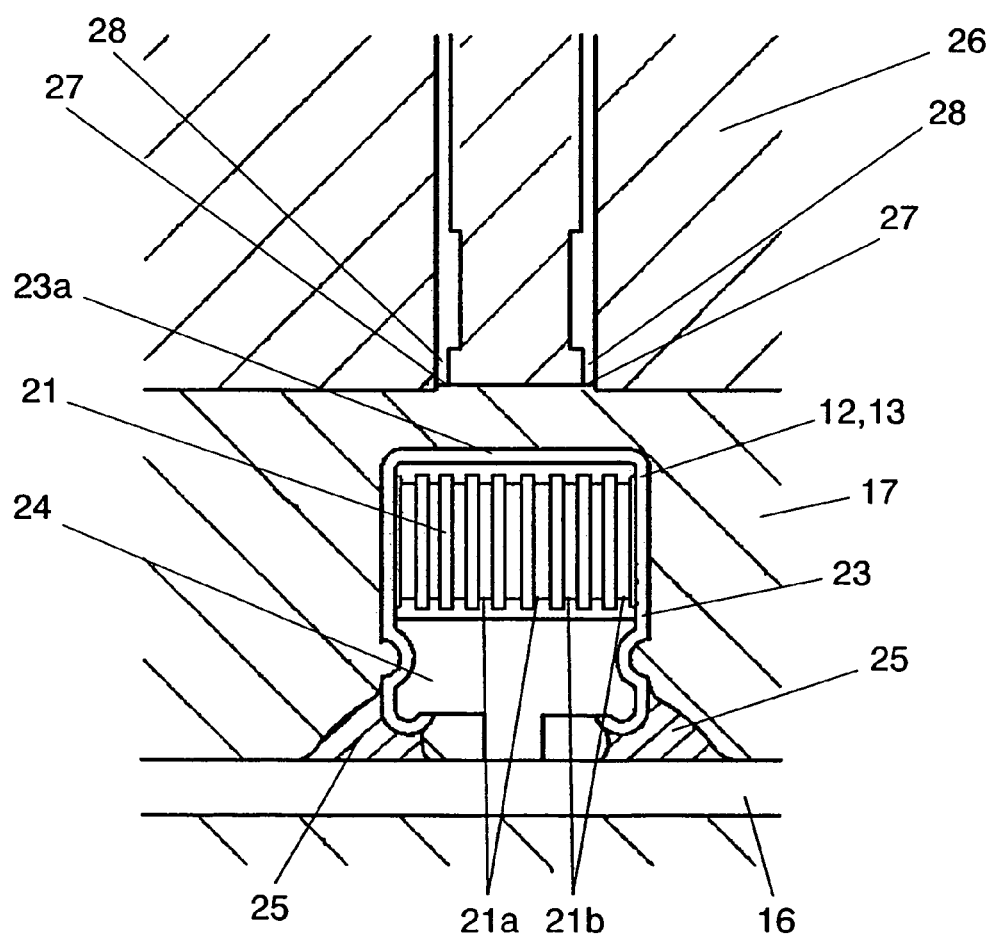
FIG. 3 is a sectional view illustrating the molded-in state of the motor.
Figure 4:
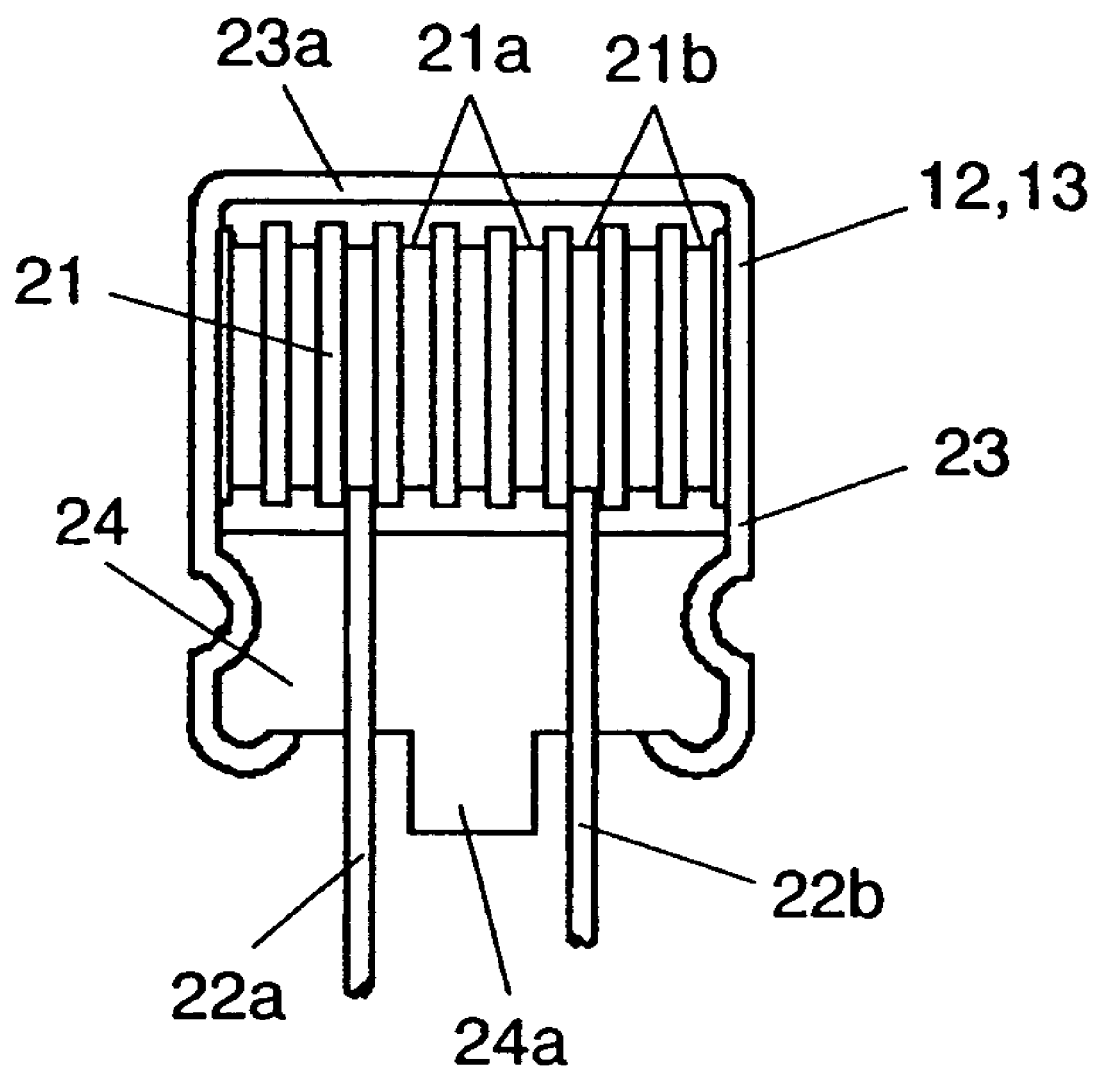
FIG. 4 is a sectional view of a capacitor installed in the motor.

1 Motor
2 Armature winding
3 Rotor
3a Rotor magnet
4 Magnetic flux detector
5 Drive logic controller
6 Inverter circuit
7 Current waveform controller
8 Low DC voltage converter
9 Rectifier
10 Stator
10a Stator iron core
11 Insulator
12 First capacitor
13 Second capacitor
14 Drive circuit
15 AC-source connecting terminal (AC-source connecting means)
16 Board
17 Thermosetting resin
18 Bracket
19 Bearing
20 Shaft
21 Wound element
21a Anode foil
21b Cathode foil
22a Anode lead terminal
22b Cathode lead terminal
23 Metal case
23a Top face
23b Semi-spherical top face
23c Protrusion
24 Sealing rubber
24a Protrusion
25 Adhesive
26 Mold
27 Gas outlet
28 Air vent
Q1, Q3, Q5 Upper switching element
Q2, Q4, Q6 Lower switching element

DETAILED DESCRIPTION OF THE PREFERRED EMBODIMENTS

A motor of the present invention includes a stator in which an armature winding is wound around a slotted stator iron core via an insulator, a rotor rotatably disposed relative to the stator, a drive circuit disposed on a board for controlling a current applied to the armature winding and rotation of the rotor, and a capacitor which is at least one of a first capacitor and a second capacitor disposed on the same board as the above. The first capacitor smoothes a voltage supplied to the armature winding, and the second capacitor smoothes a supply voltage from outside.

The board and the stator are integrally molded in using resin, which forms a cover. The drive circuit includes a group of switching elements for supplying the current to the armature winding and a drive logic controller for controlling the on and off state of the group of switching elements.

In the capacitor, a wound element, in which an anode foil and a cathode foil are wounded, is housed inside a cylindrical metal case with a closed top face. This metal case is sealed with rubber. An anode lead terminal and a cathode lead terminal of the capacitor protrude outside through this sealing rubber. The capacitor is mounted upright on the board and fixed by applying adhesive at two diagonally opposite areas on the bottom end of the metal case.

In this structure, pressure inside the metal case rises due to the flow pressure of molding resin flowing under the sealing rubber of the capacitor between the two diagonally opposite areas on the bottom end of the metal case of the capacitor where adhesive is applied. This makes the pressure inside the metal case and the flow pressure of molding resin flowing on the upper top face roughly equivalent. Consequently, no stress is applied which otherwise may damage the metal case.

Still more, in the above motor, adhesive is applied at areas in a direction roughly perpendicular to a direction from the anode lead terminal to cathode lead terminal in order to reduce the load of the flowing mold resin applied to both lead terminals by adhesive. This eliminates a stress on joints between the wound element inside the metal case and both lead terminals.

Still more, in the above motor, a capacitor with a semispherical top face has an increased strength for the top face of the capacitor. If a protrusion is provided on the top face of the capacitor, the strength of the top face of the capacitor further increases.

Still more, if the capacitor is a solid electrolytic capacitor using organic conductive compound for its electrolyte, no electrolytic solution is present inside the metal case. Accordingly, gas by chemical reaction is not generated.

Furthermore, if a gas outlet for releasing gas generated during molding is provided near the top face of the capacitor, the flow pressure of molding resin flowing on the top face of the metal case can be reduced.

Next, an exemplary embodiment of the present invention is described with reference to drawings.

In motor 1, as shown in FIGS. 1 to 5, stator 10 is configured by winding armature winding 2 around stator iron core 10a with multiple slots via insulator 11 made of an insulating material. Rotor 3 is integrally molded with shaft 20 by effecting polar orientation of the plastic magnet during injection molding. The main magnetic pole of rotor magnet 3a of rotor 3 has polar anisotropy. Rotor 3 is rotatably disposed relative to stator 10. Magnetic flux detector 4 detects the distribution of magnetic flux generated from rotor magnet 3a, and is configured with a Hall element. This magnetic flux detector 4 detects the rotational position of rotor 3 relative to stator 10 by detecting the magnetic flux of rotor magnet 3a.

Figure 5:
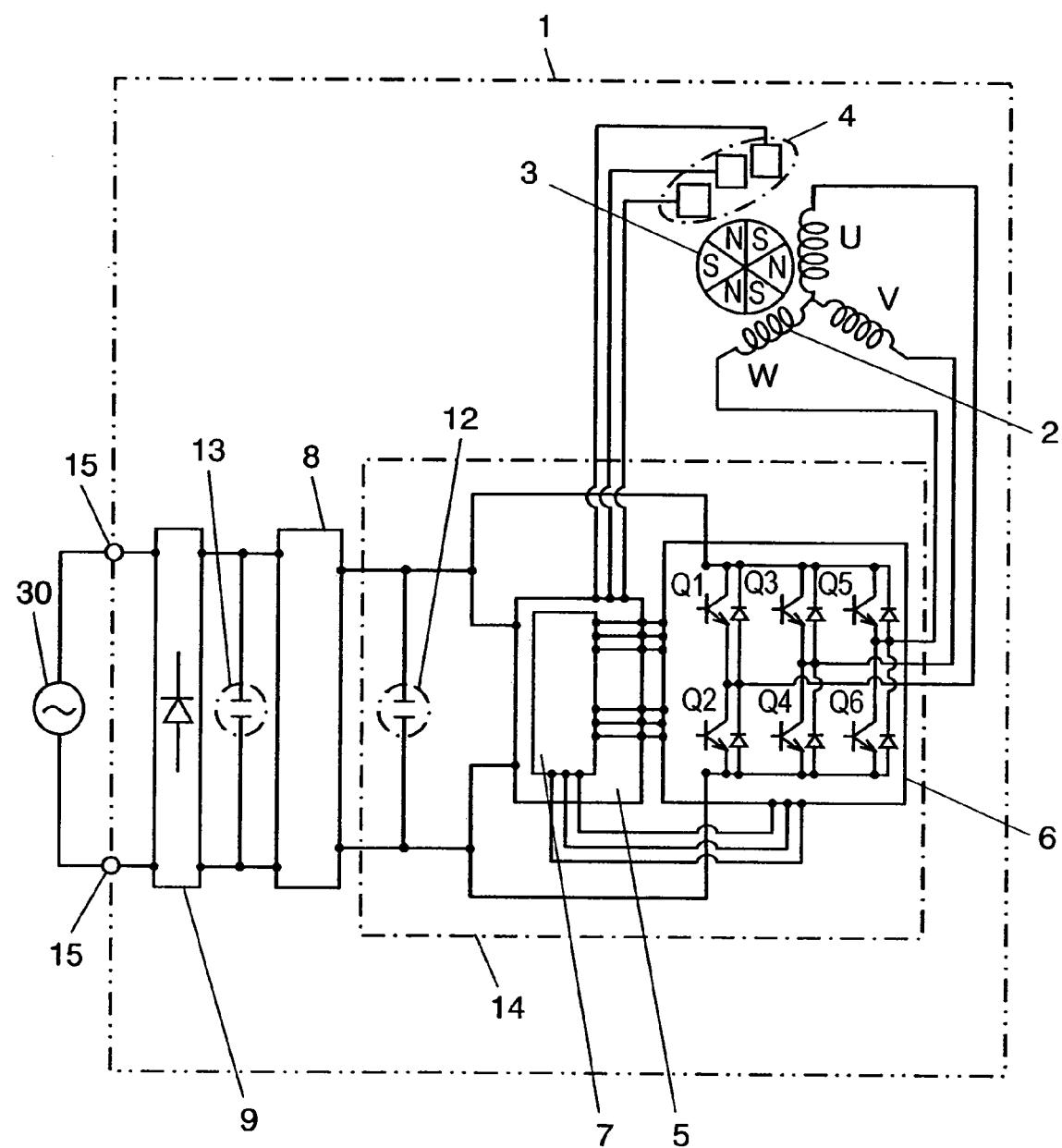
FIG. 5 is a block diagram of an electric circuit of the motor.
Figure 8:
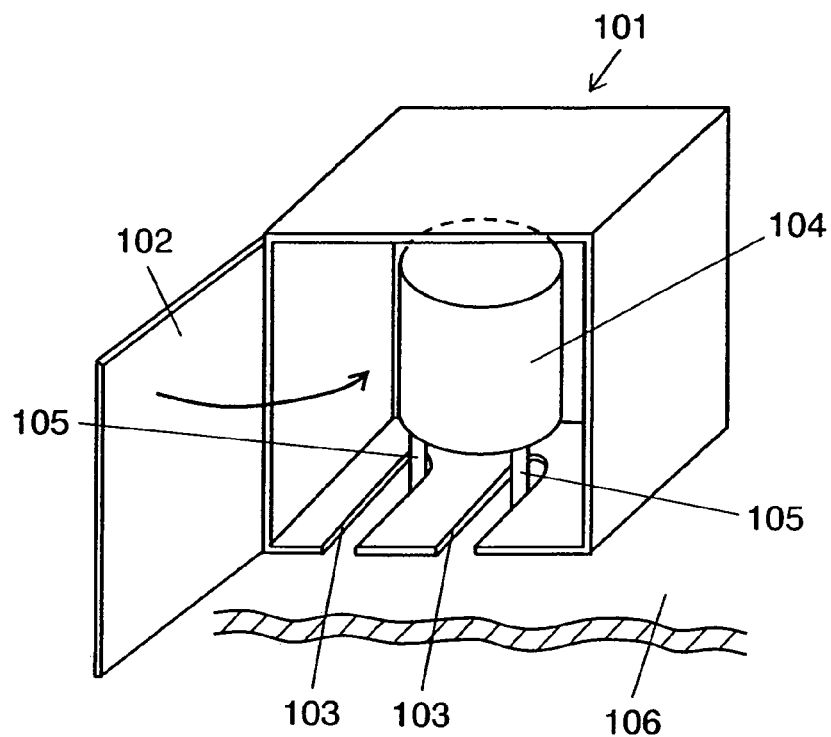
FIG. 8 is a perspective view illustrating the state that the capacitor is housed in a protective case in the motor.
Figure 9:
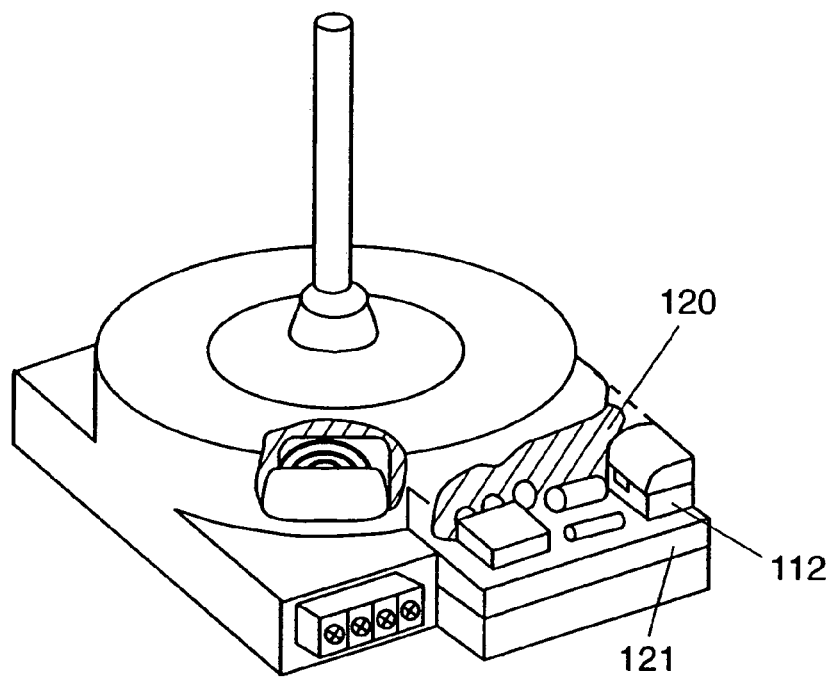
FIG. 9 is a perspective view of another conventional motor.
Figure 10:
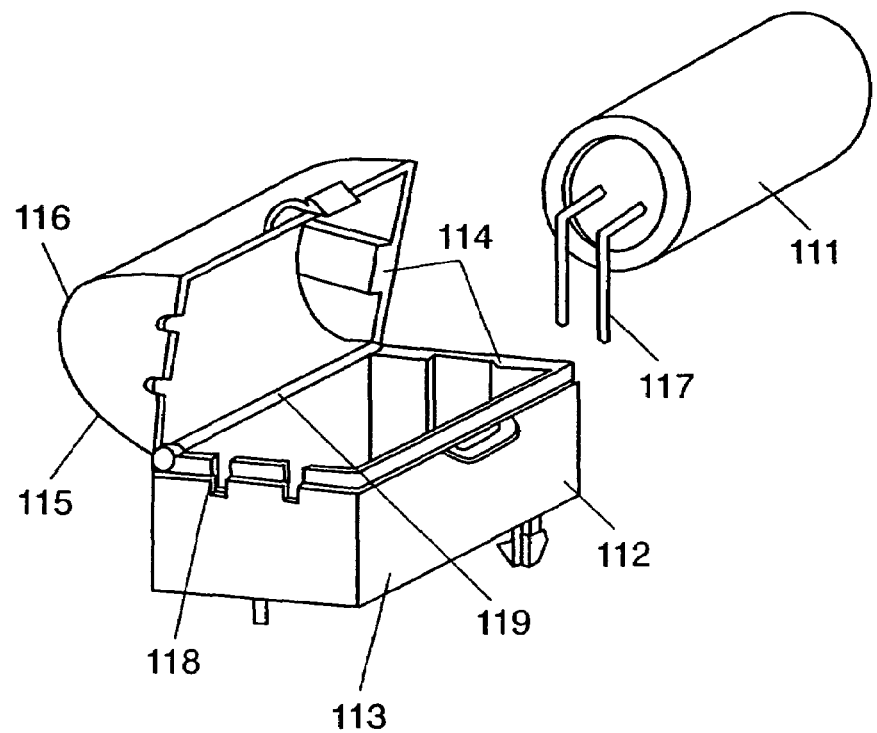
FIG. 10 is a perspective view of an electrolytic capacitor and a molding-protective case in the motor.
Figure 11:
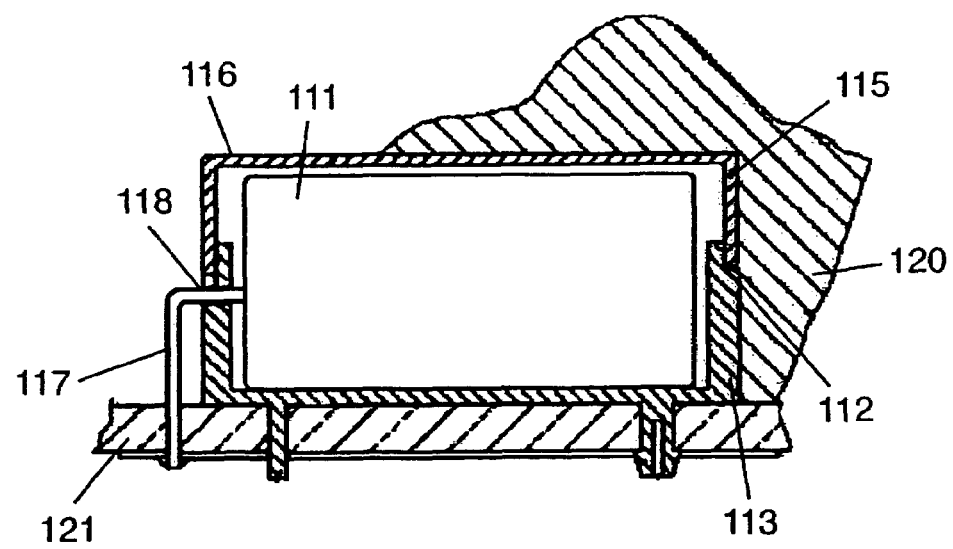
FIG. 11 is a sectional view illustrating the attachment state of the electrolytic capacitor with the molding-protective case in the motor.

In FIG. 5, inverter circuit 6 is configured by a bridging connection of upper switching elements Q1, Q3, and Q5, and lower switching elements Q2, Q4, and Q6.

Drive logic controller 5 controls the on and off state of switching elements Q1 to Q6 in a way such that a full-wave current is sequentially applied to armature winding 2 in a predetermined direction and sequence. Current waveform controller 7 adjusts output bias current by allowing feedback in a way such that switching elements Q1 to Q6 remain in the non-saturated state close to saturation so as to achieve a roughly similar waveform as that detected by magnetic flux detector 4.

As an AC-source connecting means, AC-source connecting terminal 15 is coupled to commercial AC power supply 30. Rectifier 9 applies full-wave rectification to AC voltage of AC power supply 30. Low DC voltage converter 8 is configured with a stepdown chopper circuit, and converts high voltages with a ripple after full-wave rectification by rectifier 9 to low DC voltages of 45 V or lower. This low DC voltage converted by low DC voltage converter 8 is smoothed by first capacitor 12, and then supplied to armature winding 2 via inverter circuit 6.

Second capacitor 13 for smoothing full-wave rectified voltage supplied from outside is provided between low DC voltage converter 8 and rectifier 9. Drive circuit 14 includes inverter circuit 6, drive logic controller 5, current waveform controller 7, and first capacitor 12. This drive circuit 14 is mounted on the same board 16 together with rectifier 9, second capacitor 13, and low DC voltage converter 8.

This board 16 and stator 10 are molded in using thermosetting resin 17 such as of unsaturated polyester, which forms the cover. Bracket 18 retains bearing 19 for supporting shaft 20 of rotor 3.

First capacitor 12 and second capacitor 13 are solid electrolytic capacitors using organic conductive compound as electrolyte. In these capacitor 12 and capacitor 13, wound element 21, in which anode foil 21a and cathode foil 21b are wound, is housed inside cylindrical metal case 23 with a closed top face. Metal case 23 is sealed with rubber (sealing rubber 24). Anode lead terminal 22a and cathode lead terminal 22b protrude outside through sealing rubber 24. Protrusion 24a is provided on sealing rubber 24 such that metal case 23 is slightly elevated relative to board 16 when metal case 23 is mounted on board 16.

Capacitor 12 and capacitor 13 are mounted upright on board 16 and fixed by applying adhesive 25 which has elastic bonding characteristics (for example, silicone denatured polymeric elastic adhesive) at two diagonally opposite areas on the bottom end of metal case 23, which are in a direction roughly perpendicular to a direction from anode lead terminal 22a to cathode lead terminal 22b.

For integral molding by thermosetting resin 17, using mold 26, gas outlet 27 is provided near capacitor 12 and capacitor 13. Air vent 28 is provided in mold 26 adjacent to this gas outlet 27 for releasing gas generated during molding outside. By the use of vacuum equipment (not illustrated), gas generated during molding is vacuumed outside of mold 26 through gas outlet 27 and air vent 28. In this way, board 16, onto which capacitor 12 and capacitor 13 are fixed, and stator 10 are molded in.

In motor 1 of the present invention as described above, pressure inside metal case 23 rises due to the flow pressure of thermosetting resin 17 flowing under sealing rubber 24 of the capacitor between adhesive 25 applied at diagonally opposite areas on the bottom end of metal case 23 of capacitor 12 and capacitor 13. This makes the pressure inside metal case 23 roughly equivalent to the flow pressure of the thermosetting resin 17 flowing on top face 23a. Consequently, no stress is applied which otherwise may damage metal case 23. Damage to the side faces and top face 23a of metal case 23 is thus preventable. Accordingly, the present invention offers a high-quality motor that suppresses damage to the capacitor and increased leakage current.

In addition, provision of protrusion 24a on sealing rubber 24 for slightly elevating metal case 23 relative to board 16 suppresses the flow pressure of thermosetting resin 17 flowing under sealing rubber 24 from becoming excessively high. This in turn reduces the stress applied to sealing rubber 24.

Adhesive 25 with elastic bonding characteristics is applied at areas in a direction perpendicular to a direction from anode lead terminal 22a to cathode lead terminal 22b. This allows adhesive 25 to reduce the load applied to the lead terminals due to flow of thermosetting resin 17. Accordingly, no stress is applied to joints between wound element 21 inside metal case 23 and lead terminals 22a and 22b. The present invention thus offers a high-quality motor that further suppresses increased leakage current.

Capacitor 12 and capacitor 13 are solid electrolytic capacitors using organic conductive compound for their electrolyte. Since no electrolytic solution is present inside metal case 23, no gas is generated by chemical reaction. As a result, the present invention can offer a motor that can reliably prevent occurrence of migration. The life of solid electrolytic capacitor depends on oxidation degradation of its electrolyte. The molded-in capacitor thus suppresses oxidation, extending the life of the capacitor.

Gas outlet 27 for releasing gas generated during molding is provided near top face 23a of the capacitor so as to reduce the flow pressure of thermosetting resin 17 flowing on top face 23a of metal case 23. This prevents any damage to top face 23a of metal case 23. Accordingly, the present invention offers a high-quality motor that can further suppress damage to the capacitor and increased leakage current.

In the exemplary embodiment, both capacitor 12 for smoothing the voltage supplied to armature winding 2 via inverter circuit 6 and capacitor 13 for smoothing the supply voltage from outside to motor 1 are built and molded inside motor 1. However, a high-quality motor is achieved even though the motor has only either capacitor 12 or capacitor 13.

The exemplary embodiment is the three-phase full-wave motor consisting of a U phase, V phase, and W phase, as shown in FIG. 5. However, two-phase full-wave motors or two-phase half-wave motors are also applicable. More specifically, also for two-phase full-wave motors or two-phase half-wave motors, wound element 21, in which anode foil 21a and cathode foil 21b are wound is housed in cylindrical metal case 23 with a closed top face, and metal case 23 is sealed with rubber. Capacitor 12 and/or capacitor 13 is mounted upright on board 16 by anode lead terminal 22a and cathode lead terminal 22b protruding outside through this sealing rubber 24, and molded in after applying adhesive 25 with elastic bonding characteristics at two diagonally opposite areas on the bottom end of metal case 23, configuring the motor. This achieves the same effect as the three-phase full-wave motor described in the above exemplary embodiment.

Furthermore, the provision of semi-spherical top face 23b, as shown in FIG. 6A, or protrusion 23c on the top face of the capacitor, as shown in FIG. 6B, improves the strength of the top face of the capacitor. This structure further prevents damage to the top face of the metal case. Accordingly, the present invention can offer a high-quality motor that can further suppress damage to the capacitor and increased leakage current.

INDUSTRIAL APPLICABILITY

The motor of the present invention prevents both damage to the capacitor and increased leakage current. Accordingly, the present invention is effective when installed in electric appliances where the use of an electrolytic capacitor is indispensable because of the need of a larger capacitance for the capacitor, such as ventilators, boilers, air cleaners, air conditioners, and wind blowers for clean rooms.

The invention claimed is:
1. A motor comprising:
  a stator in which an armature winding is wound around a slotted stator iron core via an insulator;
  a rotor rotatably disposed confronting the stator;
  a drive circuit disposed on a board, the drive circuit controlling a current applied to the armature winding and rotation of the rotor; and a capacitor which is at least one of a first capacitor and a second capacitor disposed on the board, the first capacitor smoothing a voltage supplied to the armature winding, and the second capacitor smoothing a supply voltage supplied from outside;

wherein the board and the stator are integrally molded in using resin for forming a cover, and the drive circuit includes a group of switching elements for supplying the current to the armature winding and a drive logic controller for controlling on and off states of the group of switching elements, wherein the capacitor includes a wound element, in which an anode foil and a cathode foil are wound, housed in a cylindrical metal case having a closed top face, and sealed with a sealing rubber, which capacitor also includes an anode lead terminal and a cathode lead terminal both extending through and protruding from the sealing rubber;

wherein the capacitor is mounted upright on the board and fixed to the board by applying an adhesive at two diagonally opposite areas on a bottom end of the metal case with resin existing between the sealing rubber and the board, wherein a gas outlet is provided near a top face of the capacitor.

2. The motor of claim 1, wherein the adhesive is applied at areas in a direction perpendicular to a direction from the anode lead terminal to the cathode lead terminal.

3. The motor of claim 1, wherein the capacitor has a semispherical top face.

4. The motor of claim 1, wherein a protrusion is provided on a top face.

5. The motor of claim 1, wherein the capacitor is a solid electrolytic capacitor whose electrolyte is organic conductive compound.

6. The motor of claim 1, wherein the sealing rubber includes a protrusion extending to the board.

* * * * *

UNITED STATES PATENT AND TRADEMARK OFFICE
CERTIFICATE OF CORRECTION

| | |
|---|---|
| PATENT NO. | : 7,498,762 B2 |
| APPLICATION NO. | : 11/628276 |
| DATED | : March 3, 2009 |
| INVENTOR(S) | : Masayuki Takada |

It is certified that error appears in the above-identified patent and that said Letters Patent is hereby corrected as shown below:

On the Title Page, FIELD [56], References Cited, FOREIGN PATENT DOCUMENTS: Please delete duplicate reference 2003319615 A   11/2003.

Signed and Sealed this

Twenty-eighth Day of July, 2009

JOHN DOLL
*Acting Director of the United States Patent and Trademark Office*